(12) United States Patent
Tsironis

(10) Patent No.: US 11,006,288 B1
(45) Date of Patent: May 11, 2021

(54) METHOD FOR EXPERIMENTAL OPTIMIZATION OF RF MATCHING NETWORKS

(71) Applicant: Christos Tsironis, Kirkland (CA)

(72) Inventor: Christos Tsironis, Kirkland (CA)

(*) Notice: Subject to any disclaimer, the term of this patent is extended or adjusted under 35 U.S.C. 154(b) by 82 days.

(21) Appl. No.: 16/351,938

(22) Filed: Mar. 13, 2019

Related U.S. Application Data

(60) Provisional application No. 62/644,154, filed on Mar. 16, 2018.

(51) Int. Cl.
*H04W 24/02* (2009.01)

(52) U.S. Cl.
CPC .................... *H04W 24/02* (2013.01)

(58) Field of Classification Search
CPC ..................................................... H04W 24/02
See application file for complete search history.

(56) References Cited

U.S. PATENT DOCUMENTS

| | | | |
|---|---|---|---|
| 5,456,175 A | 10/1995 | Haijima et al. | |
| 6,509,743 B1 | 1/2003 | Ferrero | |
| 6,724,730 B1* | 4/2004 | Mlinarsky | H04L 43/50 370/241 |
| 7,816,926 B2 | 10/2010 | Benedikt et al. | |
| 8,410,862 B1* | 4/2013 | Tsironis | H01P 5/04 333/17.3 |
| 9,310,410 B1* | 4/2016 | Tsironis | G01R 27/28 |
| 2005/0003785 A1* | 1/2005 | Jackson | G01S 7/35 455/260 |
| 2007/0182424 A1* | 8/2007 | Benedikt | G01R 27/32 324/637 |
| 2012/0161784 A1* | 6/2012 | Benedikt | G01R 31/2822 324/612 |
| 2014/0163940 A1* | 6/2014 | Erisman | G06F 30/367 703/2 |

OTHER PUBLICATIONS

Load Pull [online], Wikipedia [retrieved on Nov. 18, 2016], Retrieved from Internet <URL:https://en.wikipedia.org/wiki/Load_pull>.
"Computer Controlled Microwave Tuner—CCMT," Product Note 41, Focus Microwaves Inc., Jan. 1998.

(Continued)

*Primary Examiner* — Fahmida S Chowdhury

(57) ABSTRACT

An automated highly efficient "design-test-optimize" recursive loop method for experimentally optimizing embedding networks of active RF networks especially subject to wideband modulated signals, whereby the results of a matching network design are fed into the active load pull system, which synthesizes the response of the specific network design iteration and tests the transistor in real time under the emulated load conditions of the network. The weighed difference between expected and test results are used in an error function and the "design-test" loop is repeated until the error is minimized. The capacity of passive and active modulated tuners and network analysis software tools are jointly used, sharing calculated and measured data. The result of the automated optimization procedure ends into a compromise, which, if acceptable, can be processed into manufacturing with realistically expectable results.

10 Claims, 14 Drawing Sheets

(56) References Cited

OTHER PUBLICATIONS

A New Load-pull Characterization Method for Microwave Power Transistors, Y. Takayama, [online], 1976 IEEE Microwave Theory & Techniques Society (MTT-S) International Microwave Symposium, pp. 218-220. [Retrieved on Apr. 6, 2017]. Retrieved from Internet <URL:http://eeexplore.ieee.org/document/1123701/>.
Focus Compact Modeling [online], Brochure Focus Microwaves [Retrieved on Mar. 13, 2019], Retrieved from Internet <URL: https://focus-microwaves.com/focus-compact-modelling/>.
Field-programmable gate array-FPGA [online], Wikipedia [Retrieved on Mar. 15, 2018], Retrieved from Internet< URL: https://en.wikipedia.org/wiki/Field-programmable_gate_array>.
Monolithic microwave integrated circuit [online] Wikipedia [Retrieved on Mar. 15, 2018] Retrieved from Internet <URL https://en.wikipedia.org/wiki/Monolithic_microwave_integrated_circuit>.
"MPT, a universal Multi-Purpose Tuner", product note 79, Focus Microwaves Inc. Oct. 2004.

\* cited by examiner

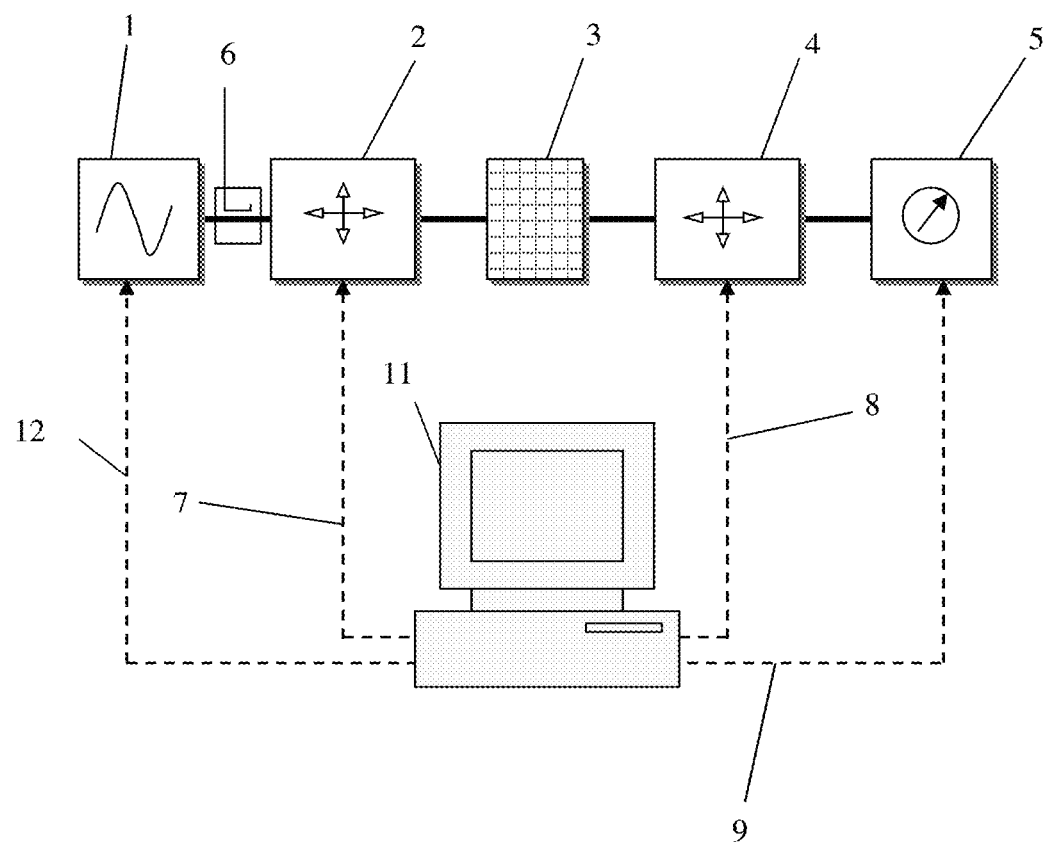
FIG. 1: Prior art

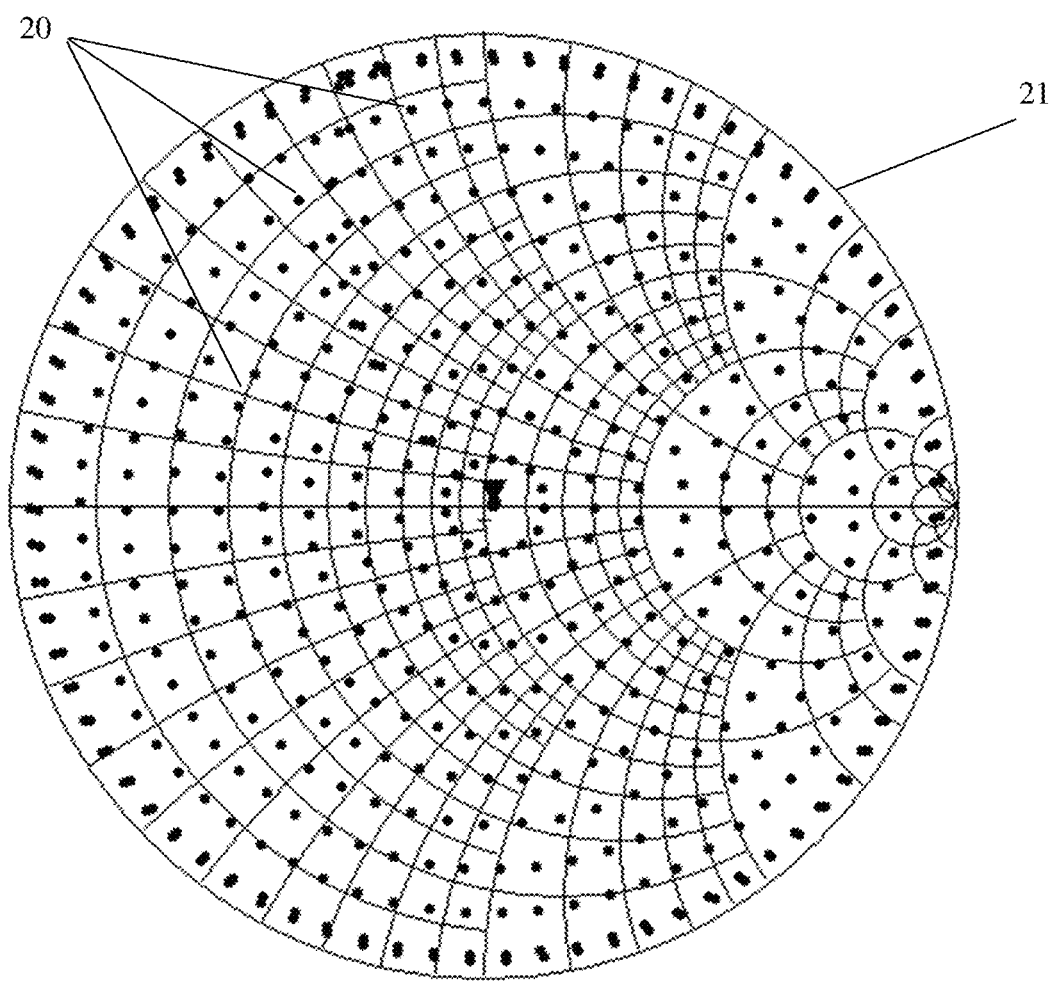
FIG. 2: Prior art

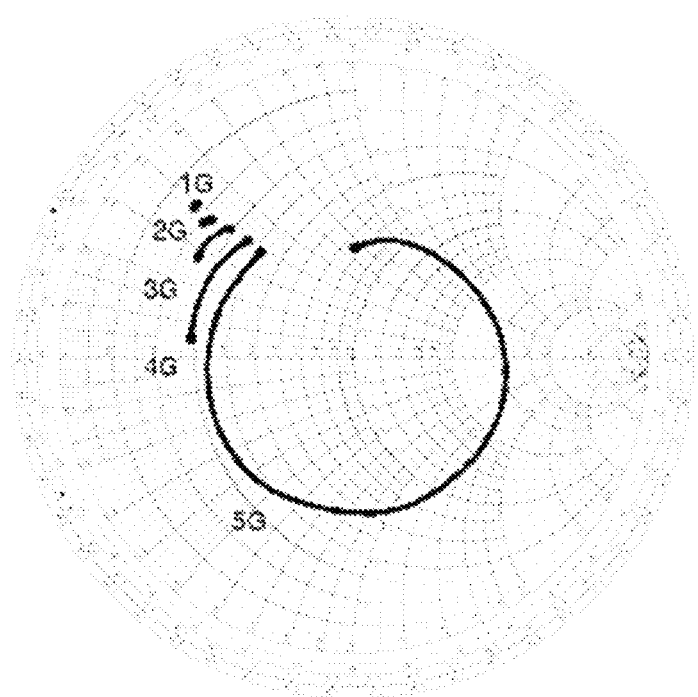
FIG. 3: Prior art

Modulation Bandwidths

| Service | Standard | Bandwidth (MHz) |
|---|---|---|
| 1G | AMPS modem | 0.030 |
| 2G | GSM | 0.2 |
| 2G | CDMA2000 | 1.2288 |
| 3G | WCDMA FDD | 5 |
| 3.5G | HSDPA | 5 |
| 4G | LTE | 20 |
| Wi-Fi | 802.11n | 20 |
| Wi-Fi | 802.11ac | 80 |
| WiGig | 802.11ad | 2160 |
| 5G | TBD | >2000 |

FIG. 4: Prior art

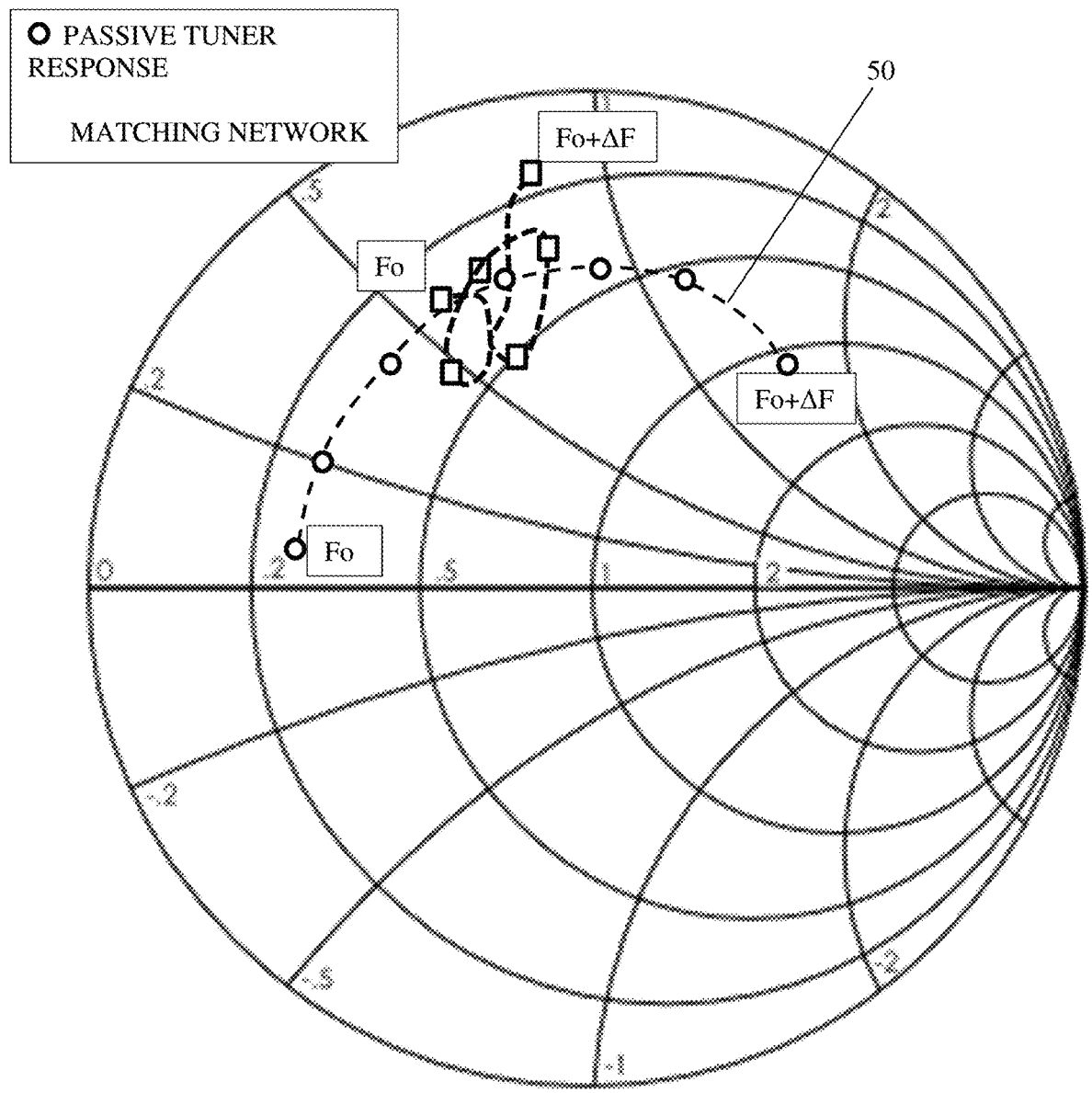
FIG. 5: Prior art

FIG. 10: Prior art

METHOD FOR EXPERIMENTAL OPTIMIZATION OF RF MATCHING NETWORKS

PRIORITY CLAIM

This application claims priority on Provisional application 62/644,154, filed on Mar. 16, 2018 titled "Method for experimental optimization of RF matching networks".

CROSS-REFERENCE TO RELATED ARTICLES

1. Load Pull, [online], Wikipedia [Retrieved on Nov. 18, 2016] Retrieved from Internet <URL:http://en.wikipedia.org/wiki/Load_pull>
2. "Computer Controlled Microwave Tuner—CCMT," Product Note 41, Focus Microwaves Inc., January 1998.
3. A New Load-pull Characterization Method for Microwave Power Transistors, Y. Takayama, [online], 1976 IEEE Microwave Theory & Techniques Society (MTT-S) International Microwave Symposium, pp. 218-220. [Retrieved on 2017 Apr. 6]. Retrieved from Internet <URL: http://ieeexplore.ieee.org/document/1123701/>
4. Focus Compact Modeling [online], Brochure Focus Microwaves [Retrieved on 2019 Mar. 13], Retrieved from Internet <URL: https://focus-microwaves.com/focus-compact-modelling/>.
5. Field-programmable gate array-FPGA [online], Wikipedia [Retrieved on Mar. 15, 2018], Retrieved from Internet<URL: https://en.wikipedia.org/wiki/Field-programmable_gate_array>
6. Ferrero, U.S. Pat. No. 6,509,743, "Active load or source impedance synthesis apparatus for measurement test set of microwave components and systems."
7. Monolithic microwave integrated circuit [online] Wikipedia [Retrieved on Mar. 15, 2018] Retrieved from Internet <URL https://en.wikipedia.org/wiki/Monolithic_microwave_integrated_circuit>
8. "MPT, a universal Multi-Purpose Tuner", product note 79, Focus Microwaves Inc. October 2004.
9. Benedikt et al. U.S. Pat. No. 7,816,926, "High frequency circuit analyzer".
10. Marchetti et al. U.S. Pat. No. 8,456,175, "Open loop load pull arrangement with determination of injections signals".

BACKGROUND OF THE INVENTION

This invention relates to design and real time experimental testing and optimizing RF embedding (matching) networks of microwave active components such as power amplifiers. Explosive increase in modern wireless communication needs requires an increased frequency bandwidth at high (including millimeter-wave) frequencies, able to handle a large volume of channels simultaneously. This leads to the requirement for large modulation bandwidths (FIG. 4). Power amplifiers must be designed to deliver predictable performance over such modulation bandwidths up to more than 2000 MHz. Transistor load pull data (i.e. transistor characteristics under non-50Ω load conditions) to be used in power amplifier design software tools are generated either by (nonlinear) numerical transistor models (see ref. 4) or by load pull measurements (see ref. 1). Even though the term "model" is generally understood to have general validity among a certain species, in this case, i.e. microwave transistors (DUT) this is not true. Nonlinear transistor models are accurate enough only in a very narrow space of transistor type and operation conditions (frequency, DC bias conditions and operation power). Outside this space, data provided by "generic" nonlinear models are notoriously inaccurate and, in fact, useless for practical amplifier designs. In that sense, i.e. the limited validity space, such models are not better than actual load pull measurements performed on specific transistor samples at specific frequencies, bias and input power. Anything yielding results below approximately 1% accuracy is practically useless. Things become in fact really hairy when the signals used are heavily modulated. The models become invalid and the load pull tuners create uncontrollable impedances (FIG. 3).

Commonly used slide screw tuners (see ref. 2) create accurate predictable reflection factors (impedances) for one carrier wave frequency (Fo) only. Harmonic tuners (see ref. 8) do so also for up to 2 concrete harmonic frequencies (2Fo and/or 3Fo). But, if the carrier frequency Fo is modulated to Fo+ΔF the impedance is not constant over the frequency band (FIG. 3). At Fo, slide screw tuners are benign devices. Only the phase of the reflection factor changes in a narrow area around Fo, whereas the amplitude is approximately constant: |Γ(Fo)|≈|Γ(Fo+ΔF)| as long as ΔF<<Fo. But this is still not enough; not only at harmonic frequencies 2(Fo+ΔF) or 3(Fo+ΔF) is the tuner behavior truly unpredictable, but the phase Φ also changes significantly: Φ(Fo)≠Φ(Fo+ΔF). It is impossible to emulate the response of a transistor which is submitted to a modulated signal stimulus to a real impedance matching network, or test and optimize such network, using passive slide screw tuners (see ref. 2 and FIG. 3).

DESCRIPTION OF PRIOR ART

Traditional passive load pull systems (FIG. 1) comprise a signal source 1, which may include a driver amplifier (not shown), an input impedance tuner 2, a DUT (i.e. a RF/microwave transistor) in a test fixture 3, an output impedance tuner 4 and a microwave power sensor 5. The injected power is measured at a coupled port 6 at the input, and the output power at the power meter (sensor) 5. Additional components, such as bias tees, attenuators, filters and couplers, as well as instruments such as DC power supplies and spectrum analyzers are also used but do not change the basic concept. The DUT's characteristics are measured as a function of source and load impedances generated by the tuners 2 and 4 at the operating (fundamental, Fo) frequency and a number of harmonic frequencies (2Fo, 3Fo . . . ). The total is controlled by a system computer 11, which uses control links 7, 8 to the tuners 2, 4 and communication links 9, 12 with the instruments for configuring, triggering and data acquisition (see ref. 1).

A possible alternative to passive slide screw tuners is presented by active systems (see ref. 3, 6 and 9). In such load pull systems the reflection factor is created by independent reverse signal injection into the output of the transistor (device under test, DUT) coming not through reflection on a passive tuner but through either an independent open loop synchronized external signal source or through a closed feedback loop (active load, see ref. 6). Such injected signal can have controlled amplitude and phase at the individual signal components of the modulated input signal and can be able to emulate arbitrary load matching network frequency patterns (see ref. 9). This would allow testing and optimizing a specific transistor's response, such as linearity and amplifying potential, subject to modulated input signals, which means that the designed matching networks can be verified and optimized before any manufacturing. In view of present lengthy and costly "trial and error" "design-manufacturingtesting" iterations, whereby designs are converted from electrical equivalent networks to MIC (FIG. 10) or MMIC (see ref. 7) photolithographic masks first, then manufactured and tested afterwards, this is a breakthrough. In FIG. 10 one seen the embedding networks including RF matching and DC biasing networks; the important detail is the provision of tuning pads allowing manual adjustment of the length of the parallel stubs. Such pads are available also placed parallel to the stubs allowing adjusting also their characteristic impedance.

The reflection factors 20 in FIG. 2, created by the impedance tuners cover, typically, the largest part of the reflection factor plan (Smith chart), 21; FIG. 2 shows typical calibration points; appropriate tuning and interpolation algorithms (see ref. 2) between the calibration points allow creating almost every impedance within the tuning range (FIG. 3); all these impedances (reflection factors) are valid at the calibration frequency only, typically the fundamental frequency Fo. The reflection factor $\Gamma=|\Gamma|*exp(j\Phi)$ at the DUT reference plane, created by a slide screw passive tuner, changes with frequency. Whereas the amplitude $|\Gamma|$ is, for small and moderate frequency changes $\Delta F \ll Fo$, quasi constant, the phase $\Phi$ does change, under circumstances significantly. The change in $\Phi$ depends on $\Delta F$ and the electrical length L of the transmission line inserted between the DUT and the tuning probe (slug) of the tuner as follows: $\Delta\Phi(deg)=-0.024*L(cm)*\Delta F(MHz)$. For a typical L=10 cm and a typical $\Delta F$=50 MHz this yields $\Delta\Phi$=−12 degrees. In fact, the electrical length, because of use of dielectrically filled cables, can easily exceed 10 cm and operation up to and above 100 MHz modulation bandwidth is possible, in which case the phase change can easily reach 50 degrees. Such dispersion in the impedance control is unacceptable. It is significant to notice that the phase dispersion does not depend on the actual frequency Fo itself. Active tuning systems (see ref. 9) can, as mentioned before, synthesize instantaneous reflection factors at will, using complex de-modulation/modulation strategies. However this capacity has not been used in a closed loop design-test-optimization algorithm. This missing method is the object of this invention.

SUMMARY OF THE INVENTION

In hitherto matching networks for modulated signal active networks were designed in order to match impedance contours, determined using nonlinear DUT models or load pull measurements, and to best generate the target performance (FIG. 6). However, nonlinear models are not accurate enough and the slide screw load pull tuners (see ref. 2) cannot emulate such impedance contours (FIG. 5). It is obvious that the passive, or even unmodulated active tuner-generated impedance pattern, cannot fit the needed matching network impedance contour for modulated signals. This invention discloses a method for experimentally optimizing matching networks of microwave power transistors subject to wideband modulated signals in an automated closed highly efficient "design-test-optimize" iterative loop as follows: The network parameters (typically scattering (s−) parameters) of a matching network structure are exported into the active load pull system, which emulates (synthesizes virtually) the response of the specific network iteration and tests the transistor in real time under the emulated load conditions of the network. Depending on the design targets set by the operator and the acceptance criteria (tolerances), the weighed difference between expected (target) and test results are used to calculate an error function and the network elements in the "design-test" loop are adjusted, exported to the active tuner, tested, compared with the targets and the procedure is repeated until an acceptable compromise is found. The capacity of active modulated signal tuners (FIG. 7A) and network analysis software tools are jointly used exchanging calculated and measured data (exporting matching network s-parameters to the tuner and importing measured data, de-embedded from the test fixture to the DUT reference plane). The result of the automated optimization procedure cumulates into compromise, which, if acceptable, can be processed into manufacturing of the active network with realistically expectable results.

BRIEF DESCRIPTION OF THE DRAWINGS

The invention and its mode of operation will be more clearly understood from the following detailed description when read with the appended drawings in which:

FIG. 1 depicts prior art, a typical automated load-pull test setup using passive tuners.

FIG. 2 depicts prior art, the distribution of calibration points on the Smith chart of passive slide screw tuners.

FIG. 3 depicts prior art, typical reflection factor response of a slide screw tuner, at a fixed tuning probe position, to a modulated signal of the various mobile phone bands.

FIG. 4 depicts prior art: modulation bandwidths associated with the various mobile phone bands.

FIG. 5 depicts prior art: typical matching network frequency response versus slide screw tuner response.

FIG. 7A depicts the block diagram; FIG. 7B depicts the signal decomposition and processing.

DETAILED DESCRIPTION OF THE INVENTION

In this invention the term "active RF networks" refers to integrated circuits, be it MIC (microwave integrated circuits) or MMIC (monolithic MIC), having at least one "active" semiconductor device such as a transistor, diode or else. The term "active" is not used in its strict meaning, i.e. the produced energy is higher than the injected energy. In that else, rigorously speaking, there are no active devices in nature. What is commonly called "active" refers to energy transformers, i.e. an amplifier is active because the output RF power is higher than the input RF power, but if the DC supply energy is taken into the account then the total produced power is still smaller than the total consumed power. So, we use the term "active" referring only to RF power. The term "active tuner" is used to describe a tuning network, wherein the impedance presented to the DUT ports is not created exclusively by reflection on passive load (such as mechanical tuner) but is virtual, i.e. the returned signal is, at least partly, created by external synchronized source or by sampling, amplification and re-injection of the primary signal.

Figure 6:
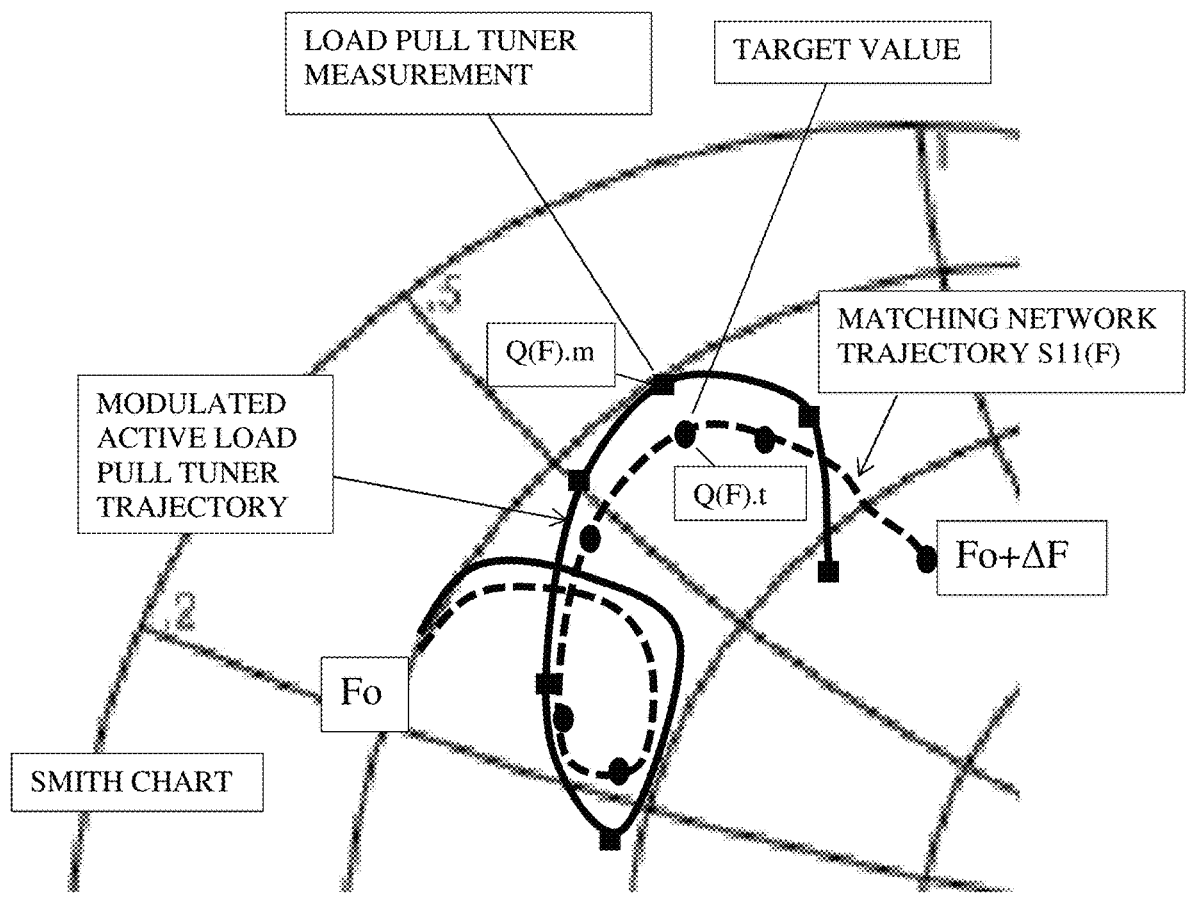
FIG. 6 depicts the overlapping of typical matching network and targeted tuner reflection factor frequency response.
Figure 7A:
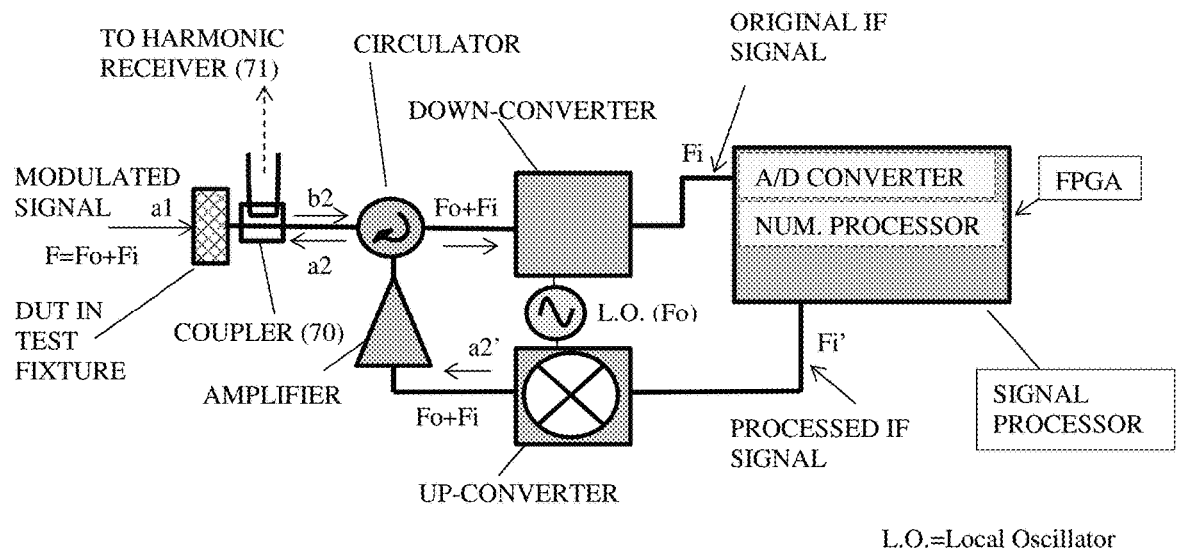
FIGS. 7A through 7B depict active tuner for modulated signal.
Figure 7B:
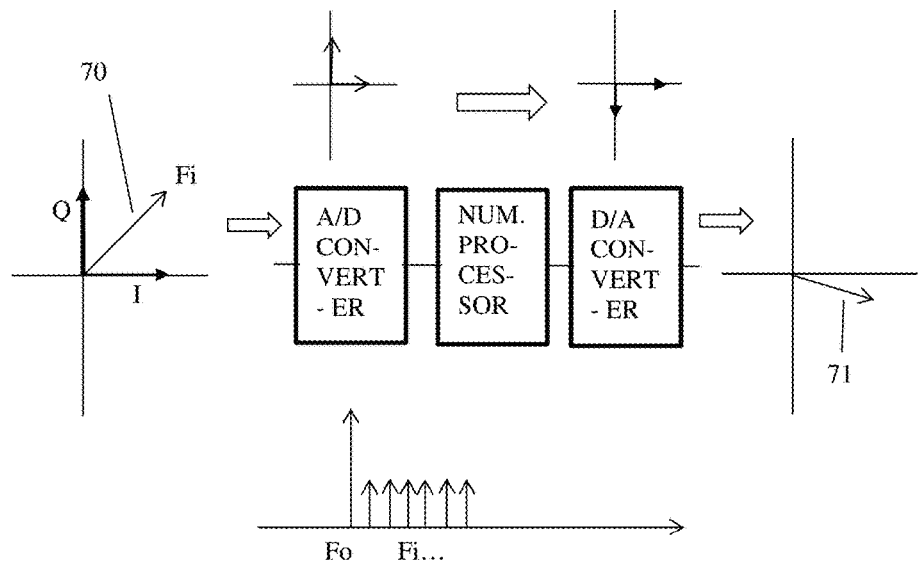

As previously outlined, traditional tuners, either passive or single frequency (non-modulated) active, cannot create instantaneous wideband arbitrary impedance patterns for modulated signals, as shown in FIG. 6; in the case of passive tuners the frequency response is given (FIG. 3 and item 50 in FIG. 5) and in single-frequency active systems the frequency response is a spike at Fo and nominally 50 Ohm everywhere else (in equation terms: $<a2(Fo)>\neq 0$ and $<a2(F\neq Fo)>=0$) meaning they can only tune frequency by frequency and not simultaneously over the modulation bandwidth (FIG. 4). For instantaneous wideband tuning to specific target impedances it takes instantaneous amplitude and phase control of each and all frequency components Fi of the modulated signal. This can be done by decomposing the modulated signal in its individual frequency components, numerically modifying the amplitude and phase of each individually (FIG. 7B) and returning the modified signal back into the DUT (FIG. 7A). This numerical processing cannot be done in RF frequencies in the GHz range because of the frequency limitation of Analog to Digital (A/D) and Digital to Analog (D/A) converters. Instead, the modulated outgoing signal <b2> from the DUT output is down-converted to an intermediate (IF) frequency (up to 500 MHz) that can be converted and processed numerically. For that it is digitized using high speed analog to digital (A/D) converter, and the real and imaginary part (I-Q components) of each modulation component (70 in FIG. 7B) is numerically processed using a high speed field-programmable-gate-array (FPGA, see ref. 5), which alters the sign and amplitude of the real and imaginary part of the individual signal component (FIG. 7B) creating this way a different controlled outgoing vector 71; then this modified signal vector is reverse converted from digital to analog using a second, high speed, digital to analog (D/A) converter and then the newly numerically modulated RF signal (Fi') is up-converted to the carrier frequency of the modulation components using the same local oscillator (L.O.) which has been used in the down-conversion. The up-converted modulated signal <a2'> is amplified and injected backwards into the output of the DUT to create the desired reflection factor T=<a2>/<b2>, which is now controlled for each component of the modulation signal individually. In that sense the system is a modified closed loop active system, i.e. the loop is not analog, closed at RF (GHz range) frequencies, it is digital, closed at IF (MHz range) frequencies.

A possible configuration of modulated active tuner is shown in (FIG. 7A), see ref. 9; a different configuration is also available (see ref. 10). The tuner concept of ref. 9 is further discussed here (FIG. 7A): It allows setting amplitude and phase of each modulation frequency component numerically arbitrarily through FPGA (Field Programmable Gate Array) programming by down-converting to a low IF (Intermediate Frequency) band, converting the analog signal to digital using A/D converter, processing real and imaginary components of each frequency component Fi using the FPGA and converting back to analog using a D/A converter, before upconverting to the carrier frequency Fo+Fi using the local oscillator L.O. at Fo, amplifying and re-injecting back into the DUT to create the virtual load. This means it allows synthesizing arbitrary impedance contours within the modulation band. This capacity is used to create impedance patterns emulating instantaneously the impedance patterns generated and calculated by the passive matching network, which includes the test fixture, over the entire modulation band. Therefore, testing the active device (transistor, DUT) yields experimentally and accurately the future response of the amplifier stage, before the actual design is released into the manufacturing process. Would the characterization of the DUT under realistic wideband modulation conditions be the final objective of the method, work might stop here representing simply a more advanced load pull test method.

However, the method in this invention offers more: firstly, this is not a traditional load and source pull test method: Beyond an initial load pull session to start the optimization, load pull is not what happens here. What happens here is the real-time emulation and optimization of a complex, nonlinear amplifier, without any previous attempt in manufacturing or nonlinear simulating anything, any hardware or other verifications; the method allows creating and optimizing, in real time, a virtual full active network (amplifier, mixer etc.) prototype stage for wideband modulated signals. In certain cases, only a load (output) tuner is required, in others a source (input) and load (output) tuner are required. The method provides for both.

Figure 8:
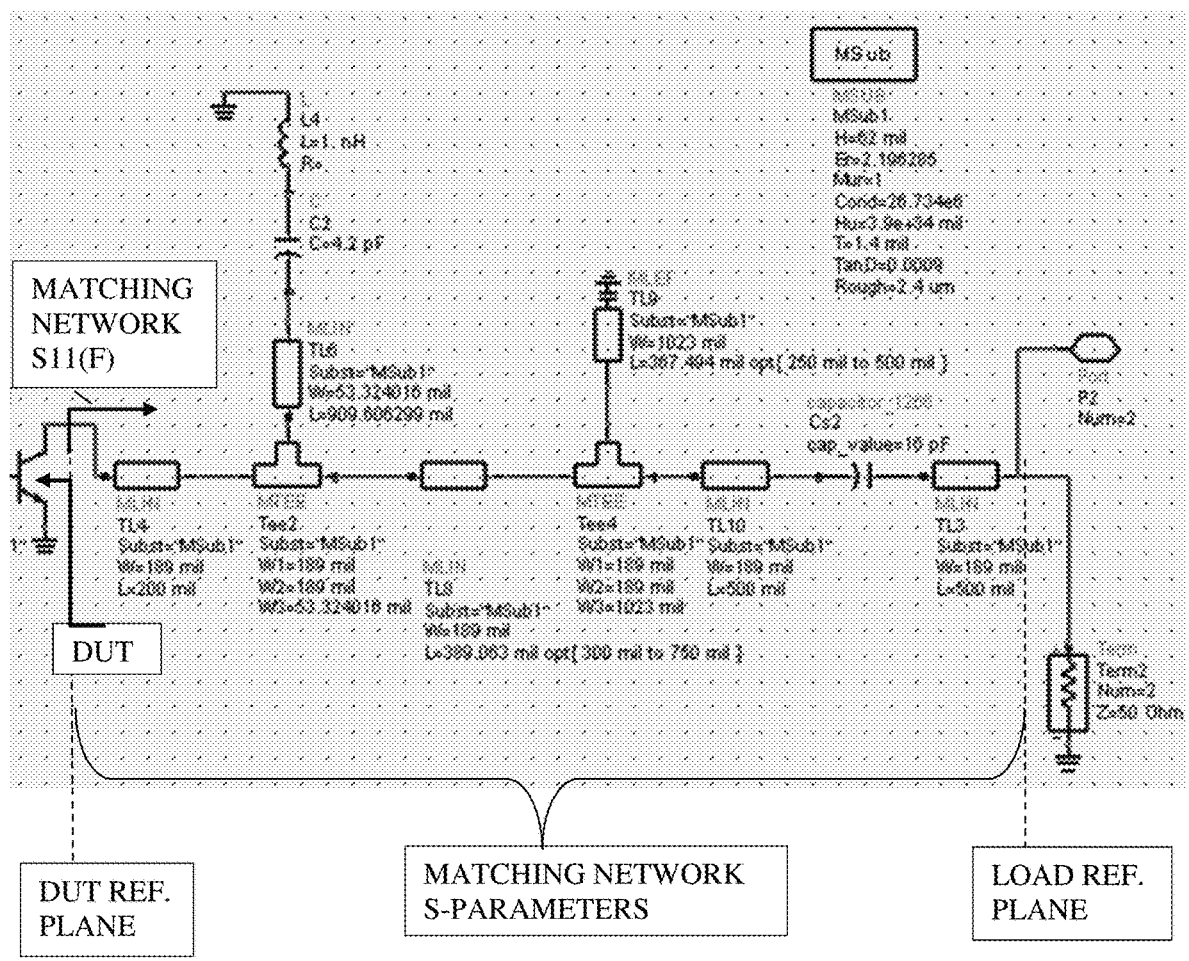
FIG. 8 depicts prior art, operation layout and console of a network analysis software.

The concept of the modulated active tuner is clear from FIG. 7A: A bi-directional coupler (70) is connected to the output of the DUT and allows detecting forward and reverse power waves <b2> and <a2>; these are injected into a harmonic receiver 71 and allow iterative active tuning and calculating the power and spectral signal response behavior of the DUT. Herein "iterative" means an algorithm, whereby the power waves <b2> and <a2> are measured and the ratio $<a2>/<b2>=\Gamma_{Load}$ is calculated and compared with the target $\Gamma_{Target}$, and <a2> is modified in an optimization loop, until the difference $|\Gamma_{Target}-\Gamma_{Load}|$ is within a given tolerance. The data extracted by the load pull setup are corrected to the DUT reference plane. However, this is not the expected amplifier performance, this is merely the DUT data. To obtain the actual amplifier performance the algorithm embeds the DUT data into the matching network s-parameter data obtained from the network analysis software. Only at this point the expected amplifier performance becomes visible, as a basis for further iterations/optimization, based on another criterion called the ERROR FUNCTION. The error function includes more than reflection factors, it includes Gain, output Power, Intermod, Adjacent Channel Power (ACPR) all quantities measured either by the VNA or associated test instruments through the coupler 70 weighed with appropriate weight factors. It is clear, that maximum output power, or gain is not the only performance criterion. The method is much more valuable when power added efficiency or nonlinearities and spectral purity are included, since the matching networks for such objectives are always slightly different. To summarize: To see the anticipated amplifier response the measured data must be de-embedded to the DUT reference plane and embedded later-on with the s-parameters of the matching network (FIG. 8).

Figure 9:
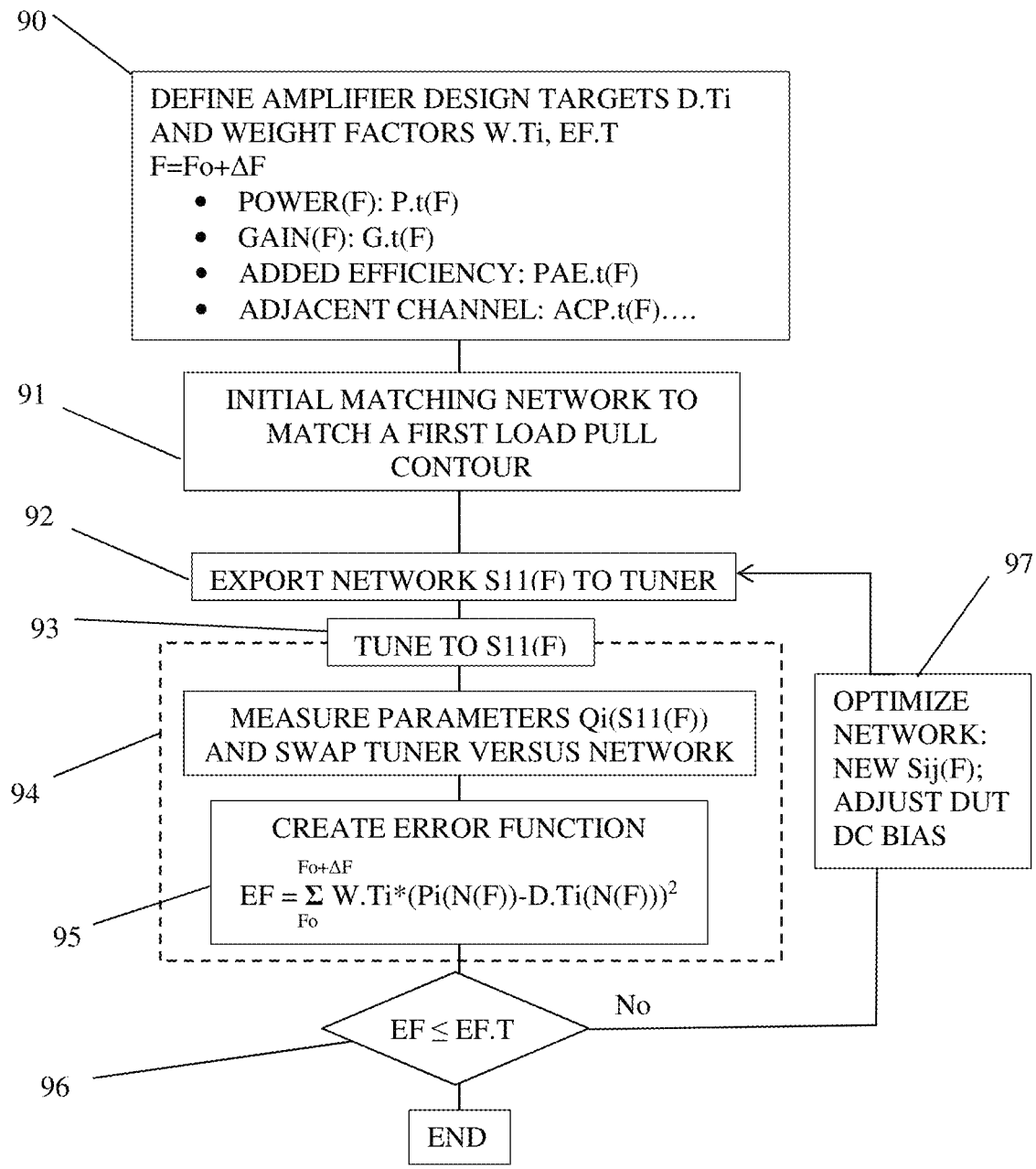
FIG. 9 depicts flowchart of experimental interactive virtual network optimization.

The procedure executes as follows (FIG. 9): After the test setup, test fixture or wafer probe station, probes and active tuner have been calibrated at the center frequency and, step by frequency step, over the required modulation frequency bandwidth, including a sufficient number of frequency steps to represent adequate information over the modulation bandwidth—typical steps are 1-5 MHz, the DUT is inserted and biased, 90. After that a fast load pull routine is executed, 91 to direct the search for a suitable matching network into the right area of the Smith chart. After that, manually or using network design tools, an appropriate network architecture is generated or imported, 91. This can be done ad-hoc by experienced designers, or taken from typical samples, provided by the manufacturers of the design software tools. The network analysis software allows automated or manual adjustment of the value of each network component (FIG. 8); subsequently 92 the calculated network parameters, typically in form of scattering (s–) parameters are imported into the tuner control software, which executes a "tuning-measuring" loop 94 consisting of tuning 93 to the input reflection factor S11(F) of the matching network of FIG. 8 (as imported from the network analysis software) and measuring the response of the DUT, in order to determine, experimentally, the best overall amplifier performance according to the pre-defined design targets, by calculating the actual error function EF, 95. During this procedure the RF behavior of the DUT will change and will affect the overall performance of the amplifier "to be" made. To determine the future amplifier performance however, one must embed the DUT data into the matching network, 94: This means measured data must be (a) de-embedded from the instrument level to the DUT, using the setup calibration data, as is already done in prior art load pull systems, and then (b) be embedded into the network parameters. The network parameters, in form of scattering (s–) parameters, are automatically generated by the network analysis/design tool. The error function is compared with the design targets 90 and, if acceptable, the process terminates; if not, the network configuration or component size values are changed, manually or automatically 97, new network s-parameters Sij(F) are calculated and imported by the tuner 92, and the sequence of tuning 93, measurement 94, corrections and comparison 95 with the target values, repeats until satisfied 96.

Summarizing: after calibration, an initial matching network is configured in computer memory. The analysis algorithm has the capacity for frequency domain nodal network analysis and exporting data (scattering (s–) parameter) to the tuner control software. Then the reflection factor pattern (S11(F=Fo+Fi)), FIG. 6, of the network is retrieved by the tuning system; the tuning system synthesizes all points S11(Fi), measures the DUT, de-embeds the load-pull components, inserts (embeds) the network and calculates the Error Function. The Error Function (EF) does not comprise s-parameters; this method is not about synthesizing a given network only, it is about designing the amplifier as a whole. Synthesizing the reflection factor S11(F) is rather an intermediate step, one criterion. Hitherto amplifier design was only about synthesizing matching networks, generated based on prior collected modelling parameters or load pull data (FIG. 8). In this invention we are making a direct jump to the end result. No prior DUT data or models are required. The future amplifier or active network is tested in real time (FIG. 9); the method allows creating a virtual matching network environment and testing a virtual amplifier or active network of which the only real physical part is the active device (transistor or DUT). The Error Function includes design objectives and actual measurements over the modulation bandwidth. Target objectives can be anything that can be measured by the test setup from Gain, Power, Intermodulation, Efficiency, Adjacent Channel Power (ACPR), Error Vector Measure (EVM), etc. Tuning to the matching network's S11(F) is just a good starting point for the optimization, but the final network may be different.

Figure 10:
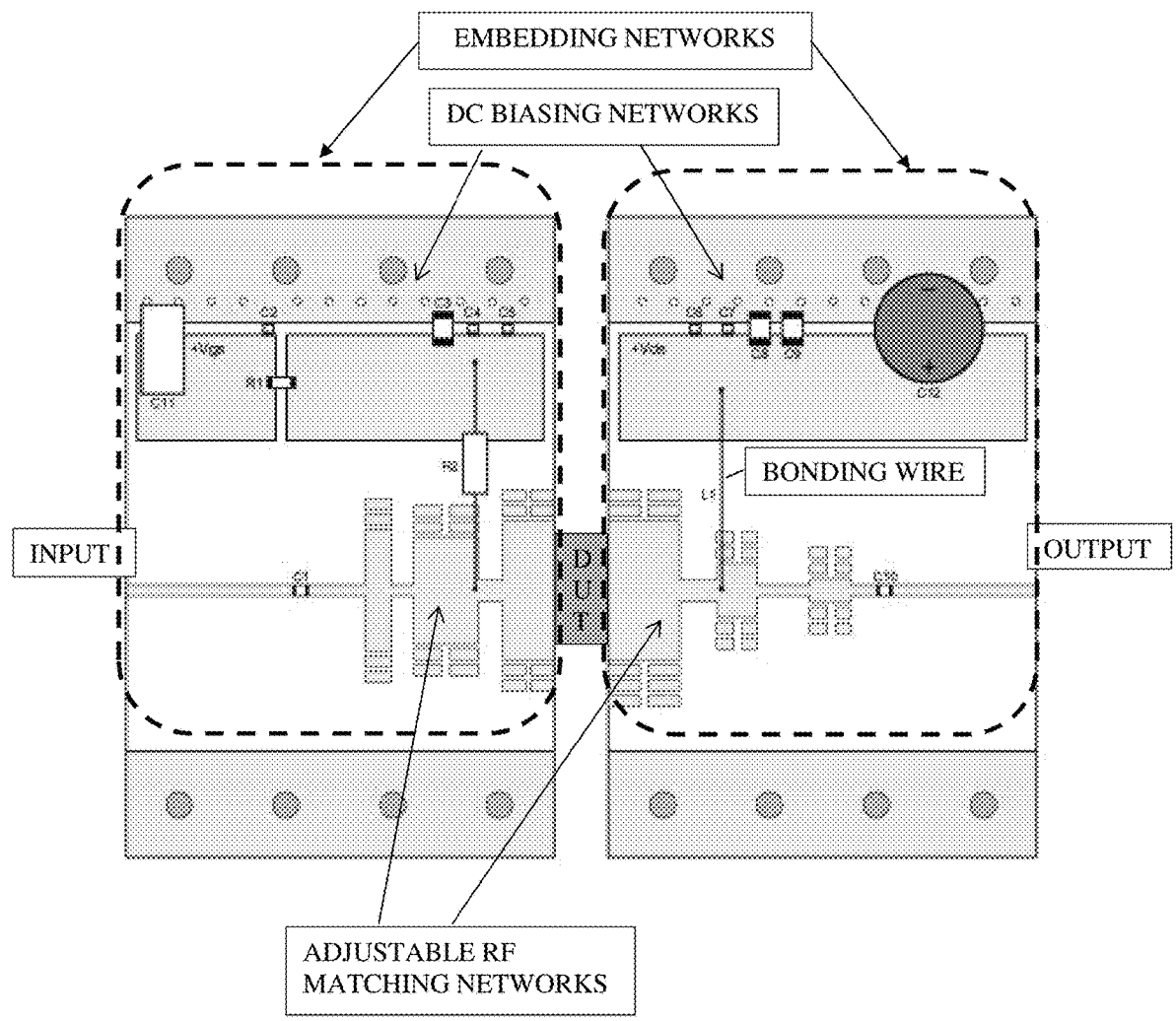
FIG. 10 depicts prior art, typical microstrip amplifier stage with manually adjustable matching elements through metallic discs, silver epoxy or bond-wire interconnections.
Figure 11:
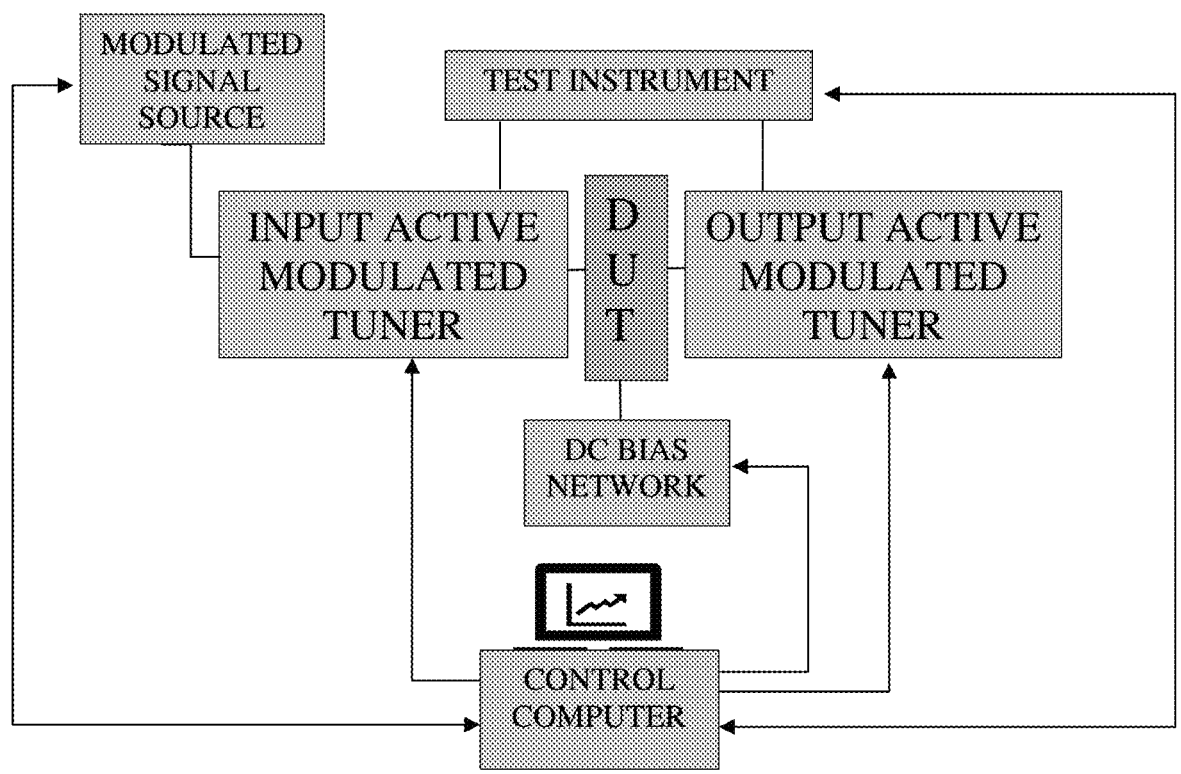
FIG. 11 depicts the setup for experimental verification and optimization of active RF circuits using input and output active modulated tuner.
Figure 12:
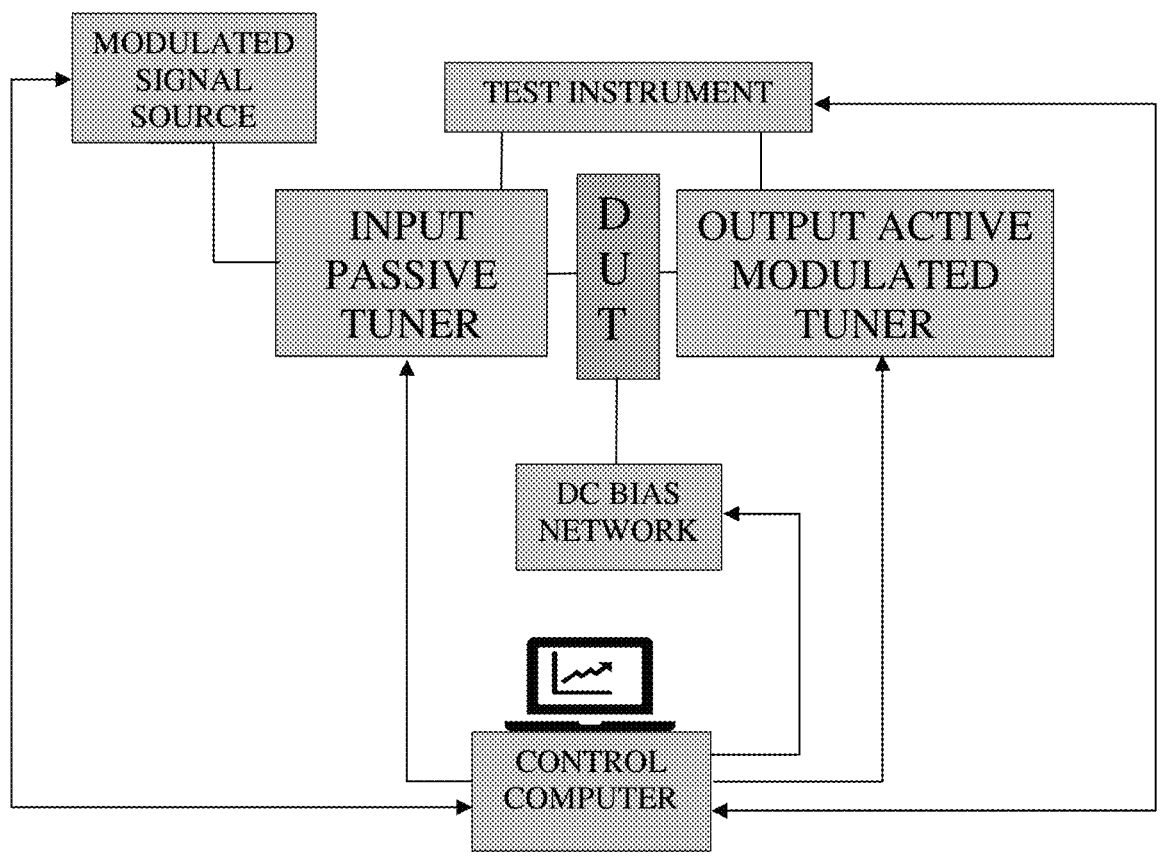
FIG. 12 depicts the setup for experimental verification and optimization of active RF circuits using passive input and active modulated output tuner.
Figure 13:
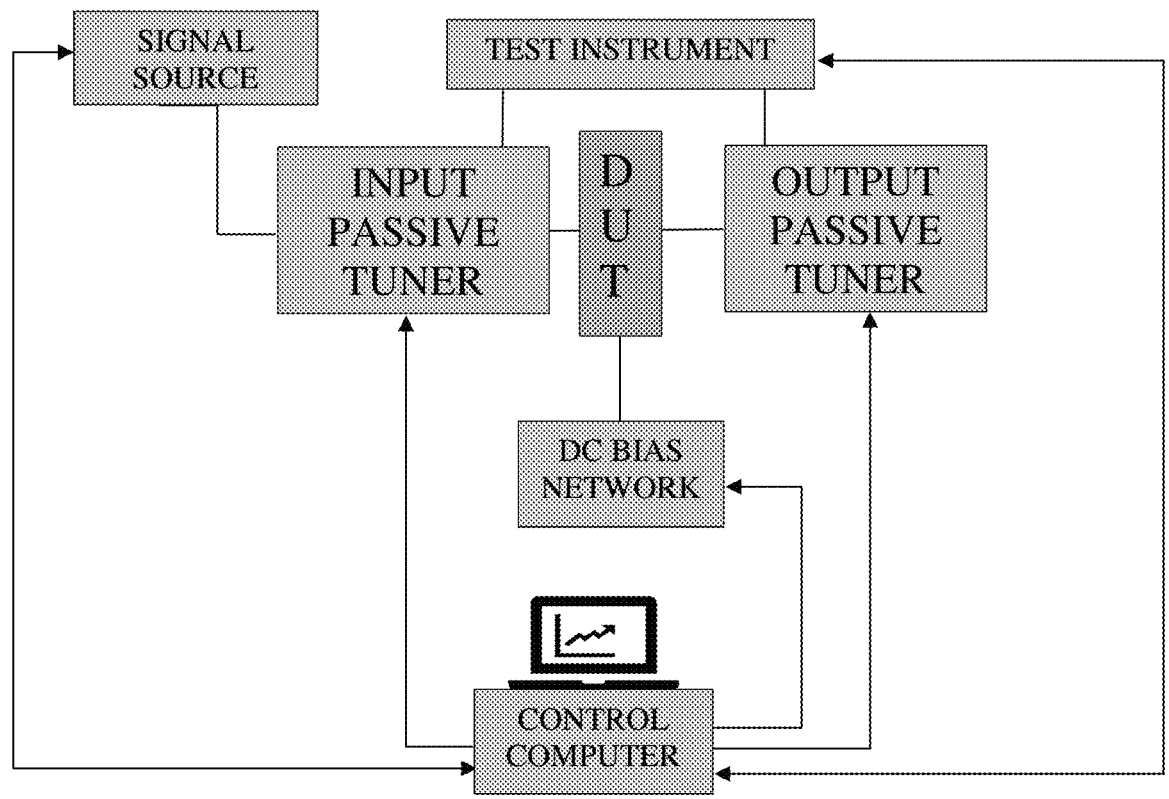
FIG. 13 depicts the setup for experimental verification and optimization of active RF circuits using non-modulated signal source and passive input and output tuner.
Figure 14:
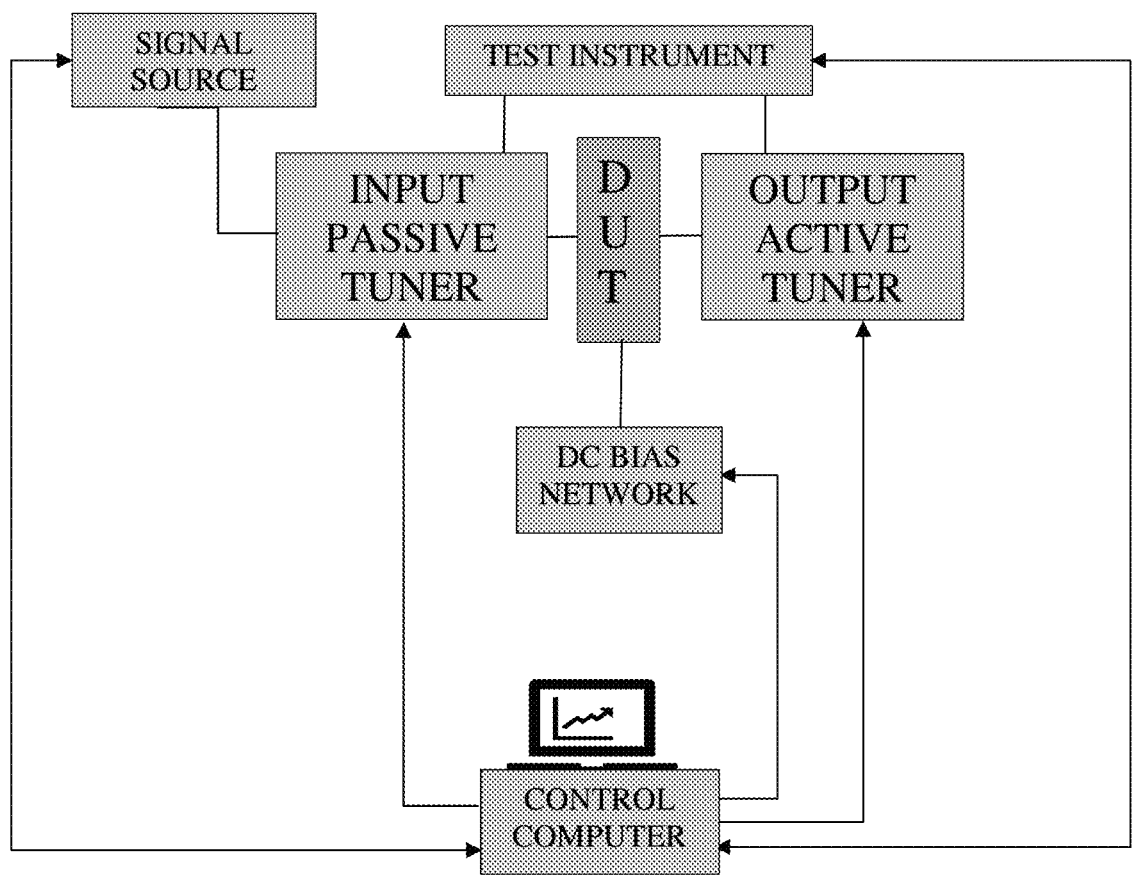
FIG. 14 depicts the setup for experimental verification and optimization of active RF circuits using passive input and active output tuner.

In a sense this method is an intelligent automation and upgrade of early times manual tweaking amplifier stages on Teflon based Duroid™ substrate material microstrip structures (FIG. 10), by placing small metallic tuning discs (moly tabs) or interconnecting small metallic pads on the transmission lines using silver epoxy or bonding wires, and moving them, more or less blindly and more or less permanently, around, while observing the amplifier gain, output power etc. trying for the best empirical overall compromise. This "tweaking" method, is, of course, not only labor intensive and time consuming, it also lags flexibility, because it is restricted by the initial microstrip layout. However, with the network analysis software and the high speed flexible tuning capacity of the active tuner, these limitations disappear. Using the new method, a broad variation of network configurations can virtually be experimented with, for designing microwave and monolithic microwave integrated circuits MMIC (see ref. 7), for which manual "tweaking" is physically impossible. None-the-less the method is applicable also for the simpler case of non-modulated signals (FIG. 13, 14). In the case of FIG. 13 both tuners are passive and in the case of FIG. 14, at least the output tuner is non-modulated active. In the case of passive tuners, calibration and impedance synthesis occur at the center frequency Fo, since passive tuners cannot emulate the network impedance response of modulated signals.

In both cases the tuners create the required impedances frequency by frequency as generated by the network analysis program and optimizes the networks with regards to the global error function, comprising the active network performance. In all FIG. 11 through 14 signals are sampled and exported using bi-directional couplers 70 as shown in FIG. 7A. The couplers are always inserted between the DUT and the tuners and proper calibration allows translating (de-embedding) the relevant RF quantities back to the DUT reference plane (FIG. 8).

Every value of every component in the various matching networks can be experimented with virtually and rapidly. Matching networks (FIGS. 8 and 10) comprise many adjustable components, as shown in this typical example. Each non-lumped element (section of transmission line) can be adjusted in length and width; lumped elements such as capacitors and inductors can only be adjusted in value. All together dozens of combinations for each chosen network configuration can be experimented with. This, obviously, should not be done manually. The speed at which the active tuner can synthesize arbitrary networks, measure and calculate the overall amplifier performance, allows an extensive search for the optimum, both using gradient optimization methods but also random search strategies. The random search comprises arbitrary changes in parameters and moving forward when the overall Error Function improves. It has to be noticed that, perfect impedance matching is not necessarily the optimum condition. The matching networks have losses, which, for the same impedance pattern, depend the choice of network configuration and the values of the tuning elements. This means that there is not a single solution to match a device. The user must experiment and find the best compromise for overall performance, which the proposed method allows.

A typical Error Function comprises, for all frequency components F=Fo+Fi, the targeted quantities Qj with the associated weighting factors Wj and the target values Tj. For instance if Fo=4 GHz, Fi=0, 1, 2, 3 . . . 50 MHz, Q1=Pout (Output Power), Q2=PAE (Power added Efficiency), Q3=ACP (Adjacent Channel Power), W1=10, W2=7, W3=5, then the Error Function shall have the form:

EF=SUM (F=4 to 4.05 GHz, step 0.001 GHz) {10*Pout(F)+ 7*PAE(F)+5*ACP(F)}, assuming each quantity Qj is measured after the active tuner synthesizes the load Ni associated to the individual frequency F=Fo+Fi and the quantities Qj are de-embedded back to the DUT reference plane and then embedded to the amplifier output port. This is done by converting s-parameters of the setup and tuner [St(F)] and the matching network [Sn(F)] to the corresponding transmission parameters [Tt(F)] and [Tn(F)], cascading the measured data with $[Tt(F)]^{-1}$ (de-embedding) and cascading (embedding) the result with [Tn(F)]. All these operations, including tuning, can be executed in parts of a second; this means extensive search for optimum networks can be executed within minutes.

The new method allows overall real-time experimental optimization. The optimum amplifier performance is not associated exclusively with power matching the DUT to the load. This is only part of it. In a number of cases slight power mismatch improves other quantities, such as Power added Efficiency (PAE), Intermodulation or ACP and linearity in general at the price of lower output power. The loss of the matching network interferes as well. A lossy matching network, which matches best the DUT will deliver less output power than a slightly mismatched network with lower insertion loss. All these complex considerations are automatically taken into account by the proposed overall virtually experimental network optimization.

Amplifiers comprise both input and output matching networks. To verify the performance completely one needs, obviously, some kind of source (input) tuning as well. This can be accomplished using an active modulated tuner (FIG. 11), equivalent to the tuner of FIG. 7A, or a passive tuner (FIG. 12, 13, 14), see ref. 2.

This invention discloses an experimental matching network optimization method for power amplifiers or other active networks subject to modulated input signals. It uses a modulated active tuner with network synthesis capacity and a network design and optimization software application both integrated into a recursive numerical design and RF testing load pull optimization loop.

What I claim as my invention is:

1. An experimental verification and optimization method of the design of an active RF network at a multitude of frequencies, performed using a load pull test setup, comprises:
  a network analysis algorithm,
  an optimization algorithm,
  a setup step, and
  an execution step;
  wherein
    the active RF network comprises at least one active device (transistor, device under test, DUT) and at least one DUT matching network,
  and wherein
    the at least one DUT matching network is inserted between the at least one DUT and a load or a signal source,
  and wherein
    the load pull test setup comprises at least one impedance tuner and at least one test fixture housing the at least one DUT;
  and wherein
    the network analysis algorithm includes:
      importing the configuration and parameter values of the at least one device matching network,
      executing frequency domain network analysis, and
      exporting network s-parameter data to the at least one impedance tuner;
  and wherein
    the optimization algorithm has the capacity of:
      a) importing target performance and acceptance criteria of the active RF network;
      b) performing the network analysis algorithm of the at least one device matching network and retrieving s-parameter data from the network analysis algorithm;
      c) tuning to the at least one device matching network reflection factor s-parameter data using the at least one impedance tuner;
      d) extracting measured DUT data from the load pull test setup;
      e) converting the measured DUT data to active RF network data by cascading with the s-parameters of the at least one matching network;
      f) comparing the active RF network data with the target performance, and
      g) iterating by changing the at least one matching network configuration and parameter values, until the acceptance criteria are met, or a pre-set number of iterations is exceeded.

2. The experimental active RF network design verification and optimization method of claim 1,
  wherein
  the setup step includes:
    a) defining the multitude of test frequencies and calibrating the load pull test setup;
    b) mounting and biasing the DUT;
    c) entering test parameters, target values, acceptance criteria and maximum number M of iterations;
    d) entering matching network configuration, parameters and starting values and setting an iteration index N=1;
  and wherein
  the execution step includes:
    e) sweeping through the frequencies of step a), computing s-parameters of the at least one matching network and exporting to the at least one impedance tuner;
    f) tuning to the impedances of step e) using the at least one impedance tuner and measuring the test parameters of step c);
    g) de-embedding s-parameters of the test setup and the at least one impedance tuner of steps a) and f) and embedding s-parameters of the at least one matching network of step e);
    h) computing the weighed difference between the data in step g) and the target values of step c);
    i) terminate if the data of step h) satisfy the acceptance criteria of step c) or if the number of iterations N reaches or exceeds M;
    j) adjusting the at least one matching network configuration and parameter values, increasing the iteration index N and continuing with a next iteration in step e).

3. The experimental active RF network design verification and optimization method of claim 2, wherein the at least one impedance tuner is an active impedance tuner capable of independently changing amplitude and phase of frequency components of a modulated signal.

4. The experimental active RF network design verification and optimization method of claim 2, wherein the at least one impedance tuner is an active impedance tuner capable of creating reflection factor $\Gamma$ up to at least $|\Gamma|=1$ at DUT reference plane.

5. The experimental active RF network design verification and optimization method of claim 2, wherein the at least one impedance tuner is a passive slide screw impedance tuner.

6. The experimental active RF network design verification and optimization method of claim 2,
wherein
the network analysis algorithm comprises
a capacity for frequency domain nodal network analysis, and
a user interface for manual network configuration, parameter value control and DUT biasing adjustment.

7. The experimental active RF network design verification and optimization method of claim 2, wherein the load pull test setup comprises an input and an output impedance tuner.

8. The experimental active RF network design verification and optimization method of claim 2, comprising:
a passive slide screw input impedance tuner and an active output impedance tuner.

9. The experimental active RF network design verification and optimization method of claim 2 comprising:
a passive slide screw input impedance tuner and a passive slide screw output impedance tuner.

10. The experimental active RF network design verification and optimization method of claim 2, wherein at least one impedance tuner is a harmonic impedance tuner, capable of independently controlling impedances at harmonics of a fundamental test frequency.

\* \* \* \* \*